(12) United States Patent
Salokannel et al.

(10) Patent No.: US 10,329,173 B2
(45) Date of Patent: Jun. 25, 2019

(54) SYSTEM FOR TREATING WATER

(71) Applicant: OUTOTEC (FINLAND) OY, Espoo (FI)

(72) Inventors: Antti Salokannel, Espoo (FI); Mikko Karhu, Espoo (FI); Matti Luukkonen, Helsinki (FI); Tuomas Van Der Meer, Espoo (FI); Niko Isomäki, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/188,807

(22) Filed: Nov. 13, 2018

(65) Prior Publication Data

US 2019/0084846 A1    Mar. 21, 2019

Related U.S. Application Data

(63) Continuation of application No. PCT/FI2016/050346, filed on May 20, 2016.

(51) Int. Cl.
*C02F 1/463* (2006.01)
*C02F 1/461* (2006.01)

(52) U.S. Cl.
CPC .......... *C02F 1/46109* (2013.01); *C02F 1/463* (2013.01); *C02F 1/46104* (2013.01);
(Continued)

(58) Field of Classification Search
CPC ....................................................... C02F 1/463
See application file for complete search history.

(56) References Cited

U.S. PATENT DOCUMENTS 4,851,098 A * 7/1989 Kimura ..................... C25C 7/06
                                                             204/198
2011/0266203 A1   11/2011 Frisky
(Continued)

FOREIGN PATENT DOCUMENTS

CN         103101832 A     5/2013
CN         204421635 U     6/2015
(Continued)

OTHER PUBLICATIONS

International Search Report issued by the European Patent Office acting as the International Searching Authority in relation to International Application No. PCT/FI2016/050346 dated Feb. 10, 2017 (4 pages).

(Continued)

*Primary Examiner* — Salil Jain
(74) *Attorney, Agent, or Firm* — Robert P. Michal, Esq.; Carter, DeLuca & Farrell LLP

(57) ABSTRACT

A system for treating water includes an electrochemical water treatment unit having a first self-supporting framework limiting a first inner space. An electrochemical reactor is arranged in the first inner space vertically below a first opening at a top side of the electrochemical water treatment unit. The system includes a maintenance unit having a second self-supporting framework limiting a second inner space. The maintenance unit includes a second opening in a bottom side. The maintenance unit is arranged above the electrochemical water treatment unit so that the first opening and the second opening are aligned. A hoist is moveably arranged along a rail structure at the top side of the maintenance unit.

16 Claims, 14 Drawing Sheets

Figure 1:
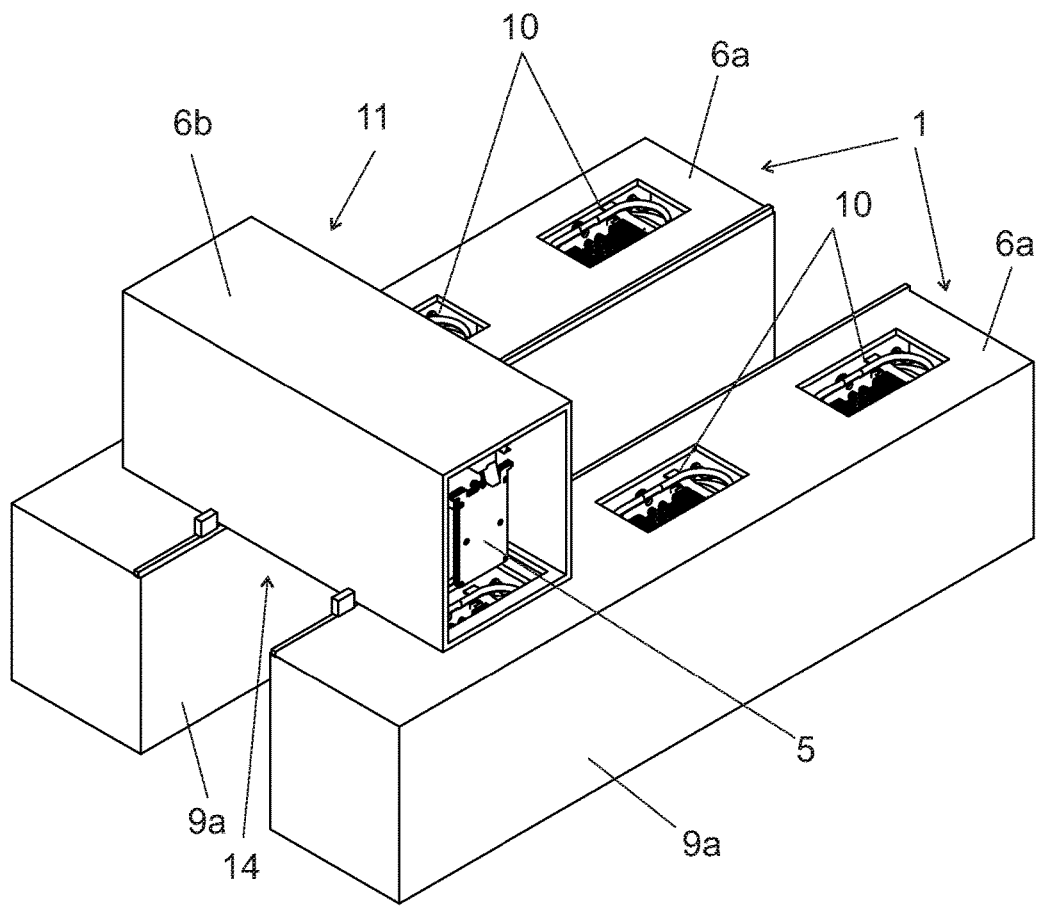

(52) U.S. Cl.
CPC .................. *C02F 2201/004* (2013.01); *C02F 2201/4616* (2013.01); *C02F 2303/14* (2013.01)

(56) References Cited

U.S. PATENT DOCUMENTS

2011/0312189 A1   12/2011  Kim et al.
2015/0251932 A1    9/2015  Laaroussi et al.

FOREIGN PATENT DOCUMENTS

| GB | 1523983 A | * | 9/1978 | ......... B65G 49/0459 |
|----|-----------|---|--------|------------------------|
| GB | 1523983 A |   | 9/1978 |                        |
| WO | 2014096549 A1 | | 6/2014 |                    |

OTHER PUBLICATIONS

Written Opinion of the International Searching Authority issued by the European Patent Office acting as the International Searching Authority in relation to International Application No. PCT/FI2016/050346 dated Feb. 10, 2017 (6 pages).

* cited by examiner

SYSTEM FOR TREATING WATER

CROSS-REFERENCE TO RELATED APPLICATIONS

This application is a continuation of PCT International Application No. PCT/FI2016/050346 filed May 20, 2016, the disclosure of this application is expressly incorporated herein by reference in its entirety.

FIELD

Publication WO 2014/096549 presents a method and an apparatus for treating industrial water. The apparatus comprises an electrocoagulation unit that has a plurality of consumable electrodes.

OBJECTIVE

An object is to provide a system for treating water, which has an improved arrangement for replacing consumable electrodes.

SHORT DESCRIPTION

The water treatment system comprises at least one electrochemical water treatment unit and a maintenance unit. Both said at least one electrochemical water treatment unit and the maintenance unit can have the form and the outer dimensions of a standardized freight container.

In electrochemical water treatment processes, electrode modules, which can comprise electrodes in the form of steel, aluminum or other metal plates, can be used as source of iron and/or aluminum and/or other metals such as copper in electrochemical reactors to precipitate impurities from the treated water stream in combination with electricity. The electrode modules can weight from 100-3000 kg, for which reason direct human maintenance is not possible nor safe, and a hoist is therefore needed to change the electrode modules in the electrochemical reactors. As the electrodes of an electrode module are consumable, it is estimated that an electrode module can last from 2 weeks up to 6 months depending on the effluent water quality and therefore on the required operating parameters.

In the system the hoist is installed inside the maintenance unit that is arranged above of the electrochemical water treatment unit. The hoist can be installed on the inside roof of the maintenance unit on a U-shaped rail structure so that the hoist can lift the electrode modules from the ground level to inside the maintenance unit and transport the electrode modules to the plate pack changing location. The top side of the electrochemical water treatment unit and the bottom structure of the maintenance unit is equipped with an opening through which consumed electrode modules can be lifted from the electrochemical reactor in the first inner space of the electrochemical water treatment unit to the second inner space of the maintenance unit and through which new electrode modules can be lowered from the second inner space of the maintenance unit into the electrochemical reactor in the first inner space of the electrochemical water treatment unit.

An advantage with the presented system is that because the hoist is provided in a second inner space of a maintenance unit and because said at least one electrochemical reactor is arranged in a first inner space of at least one electrochemical water treatment unit, replacement of the electrode modules can safely be done.

With the aid of the maintenance unit there is no need for heavy lifting equipment/machines and the water treatment system can therefore be installed to a remote location where access with heavy equipment/machines is limited due to road conditions etc. Therefore this system expands the usability of water treatment systems and increases the safety of operation.

LIST OF FIGURES

Figure 2:
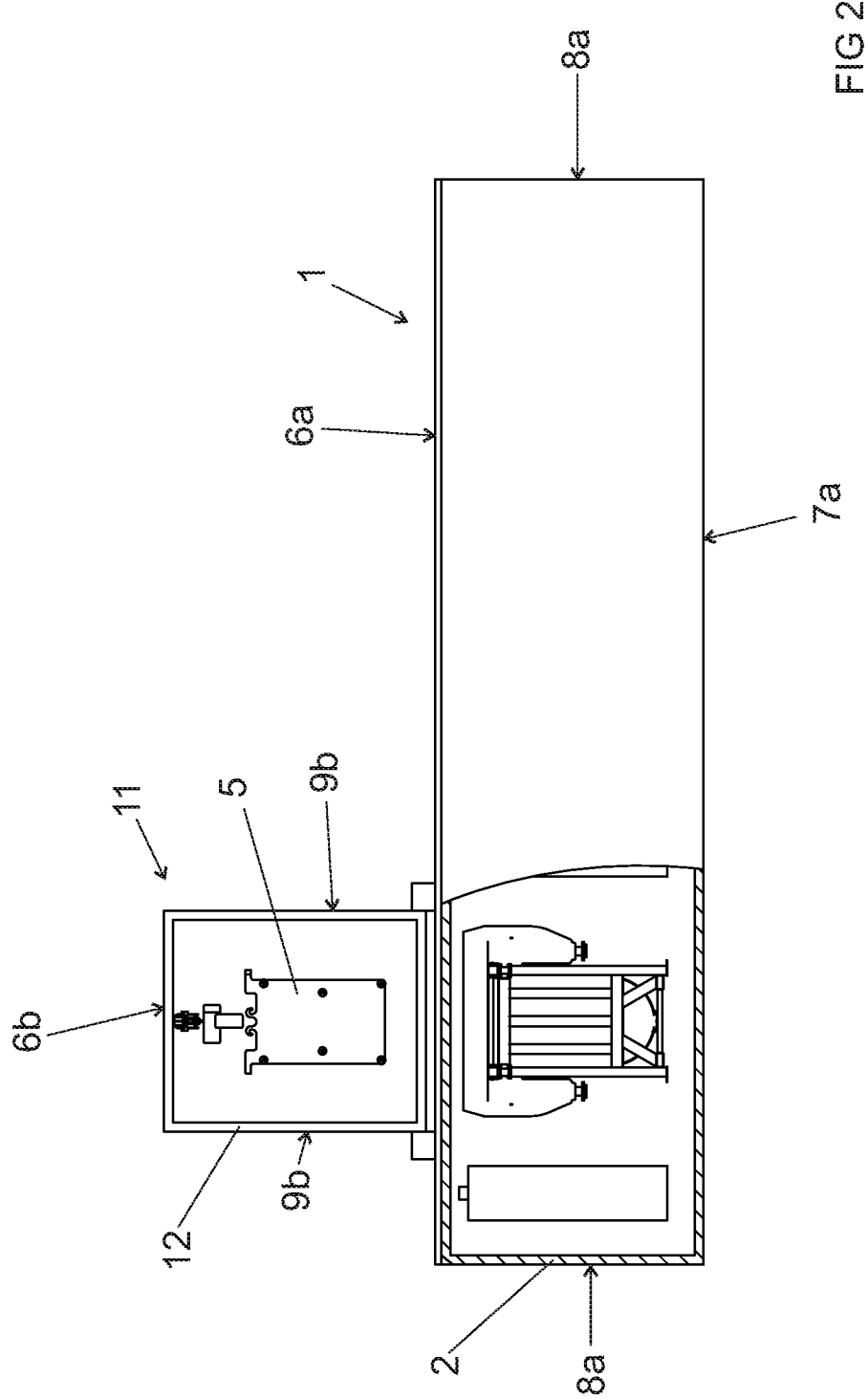
Figure 3:
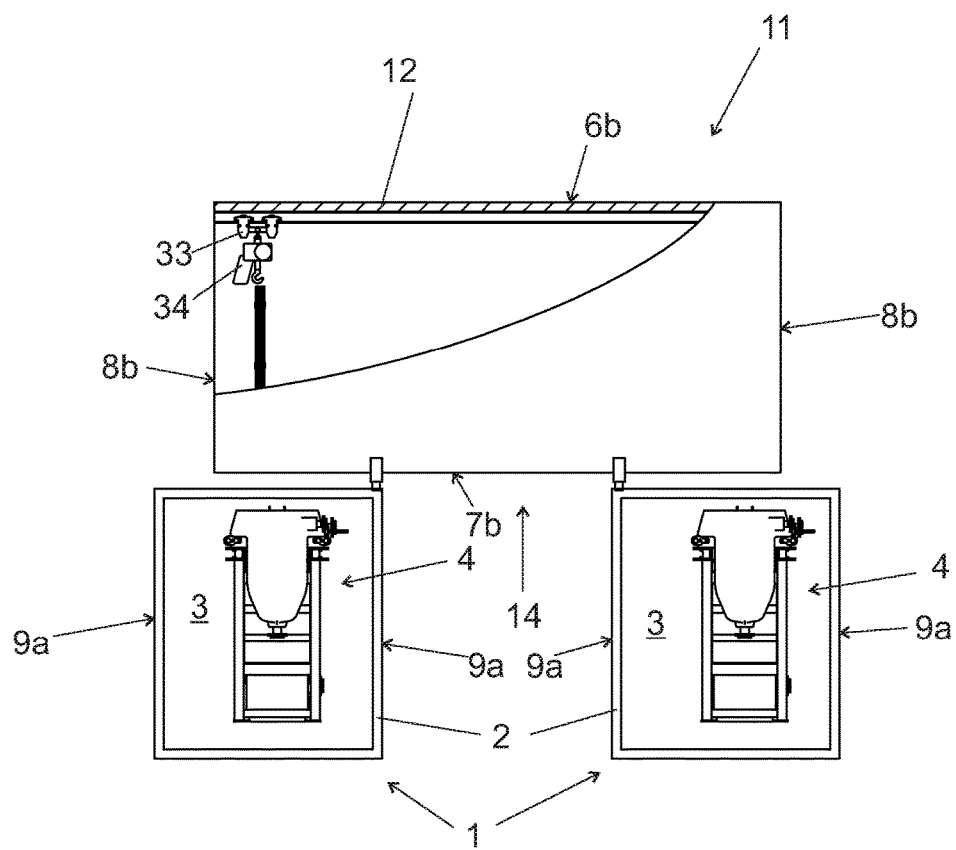
Figure 4:
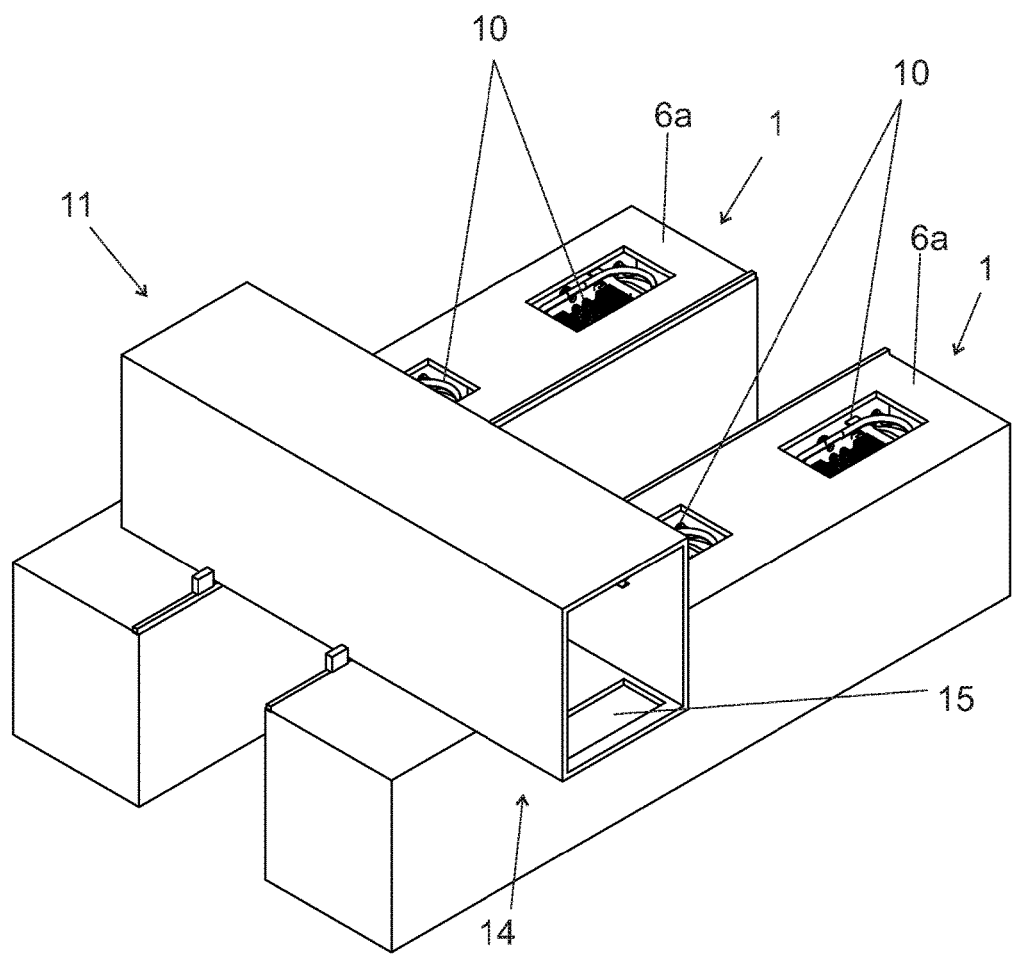
Figure 5:
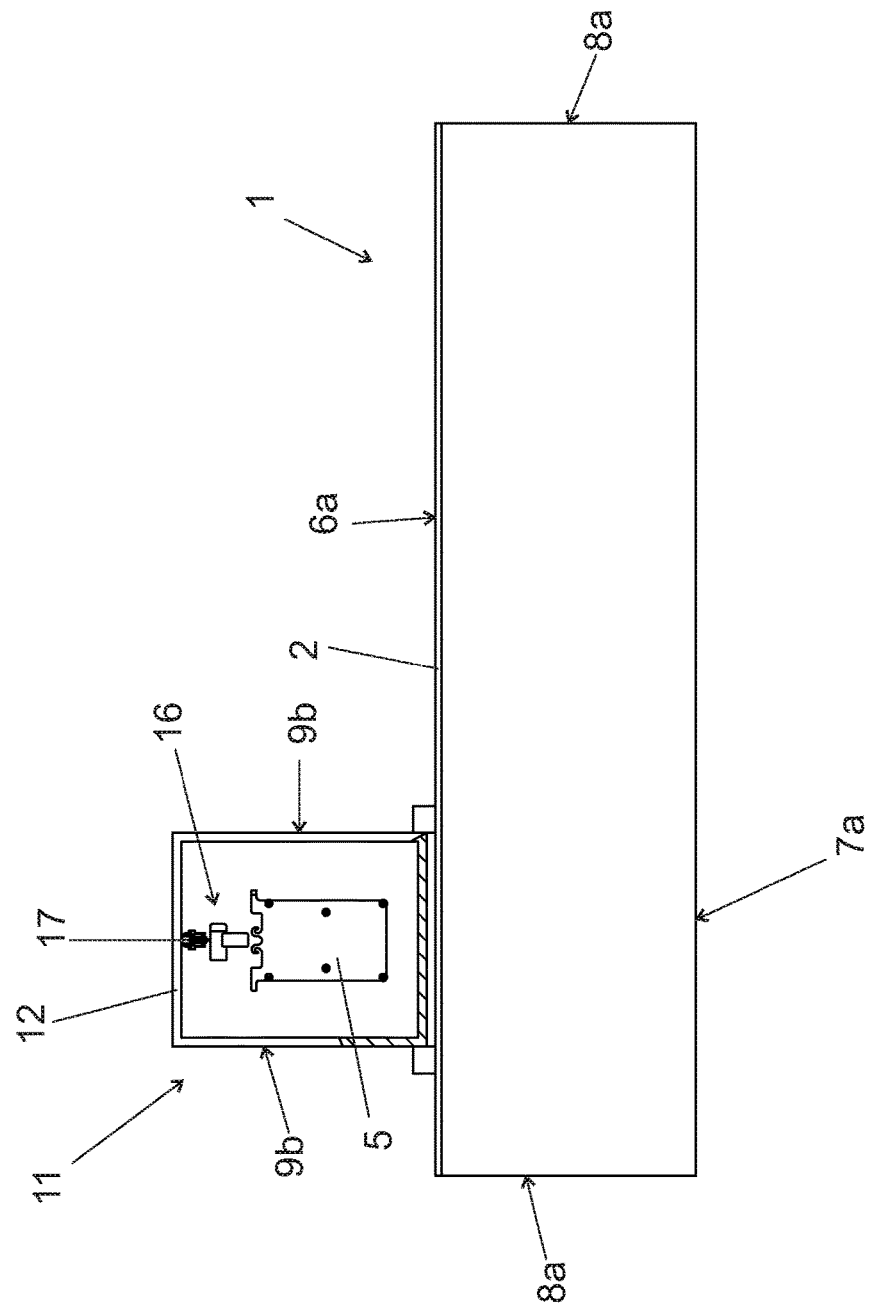
Figure 6:
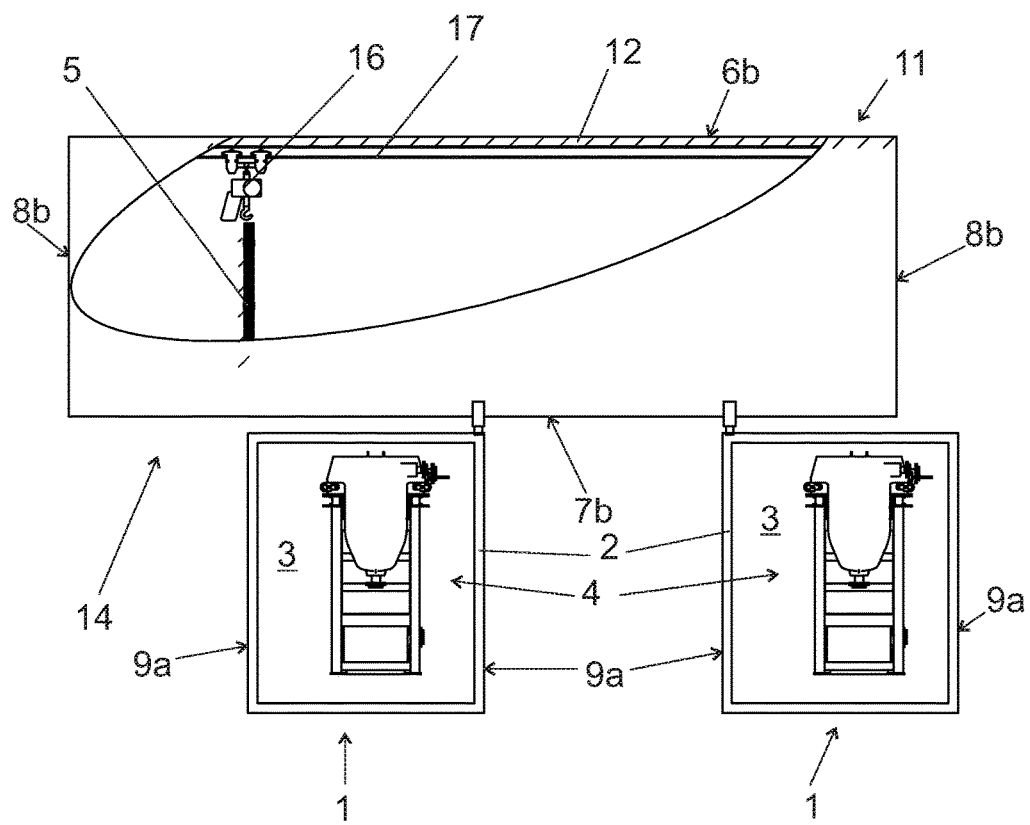
Figure 7:
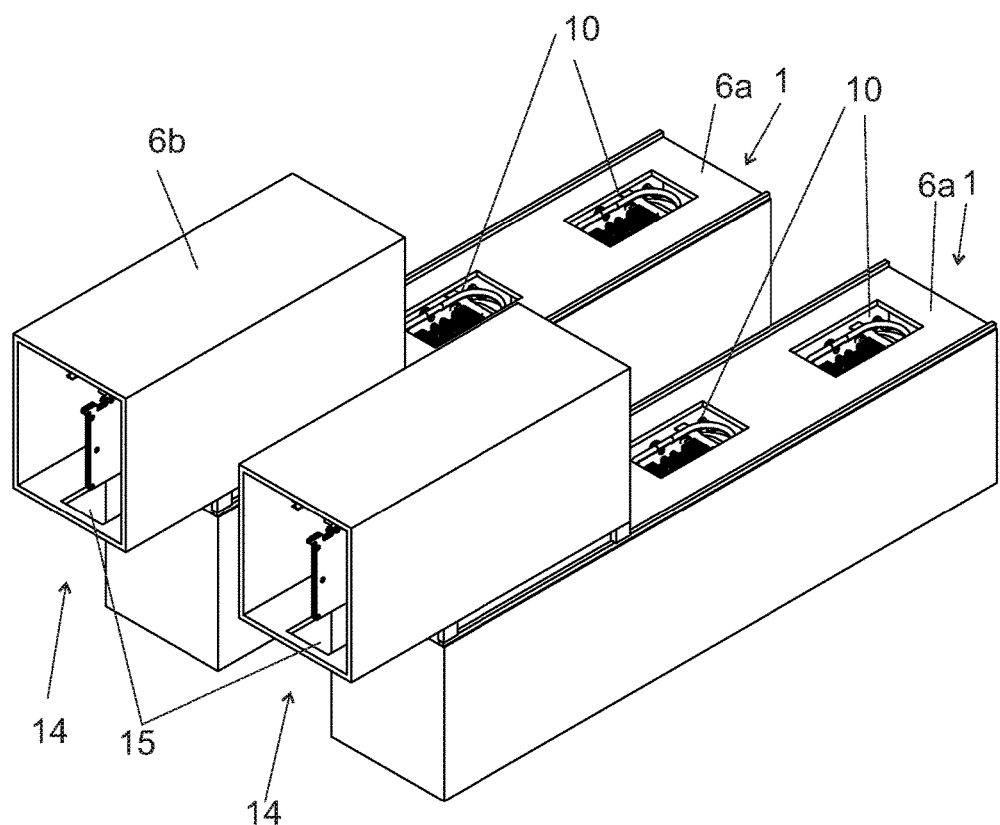
Figure 8:
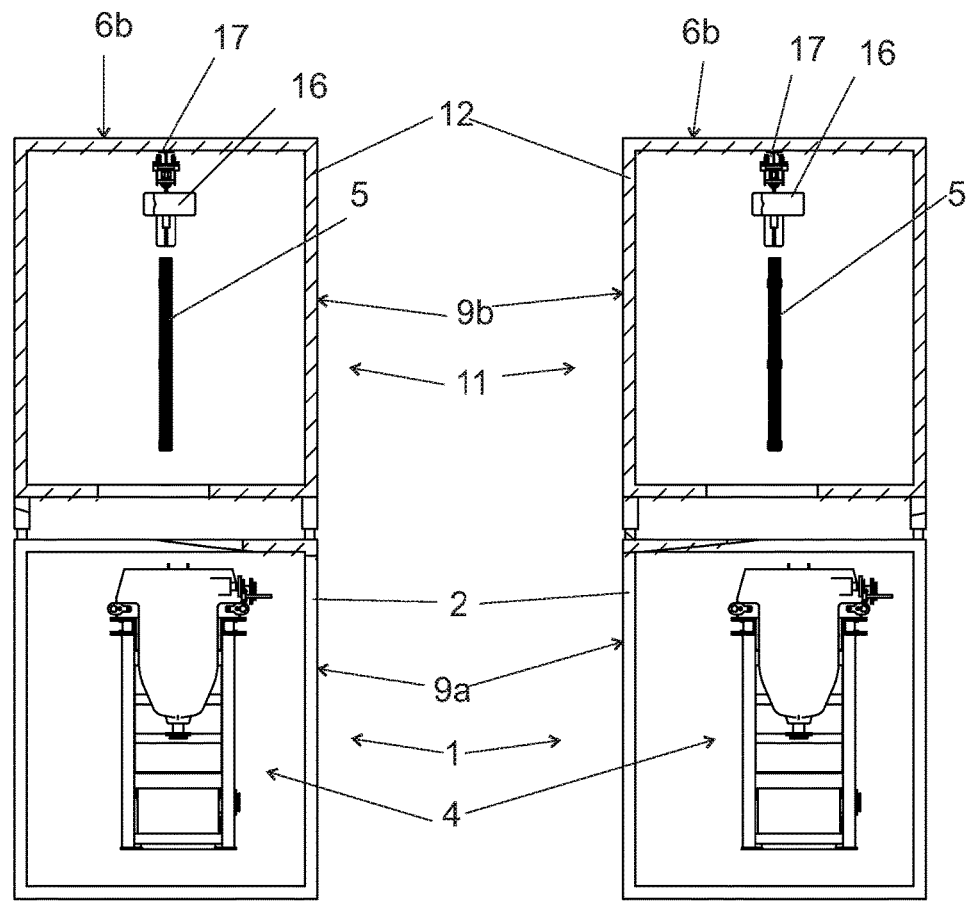
Figure 9:
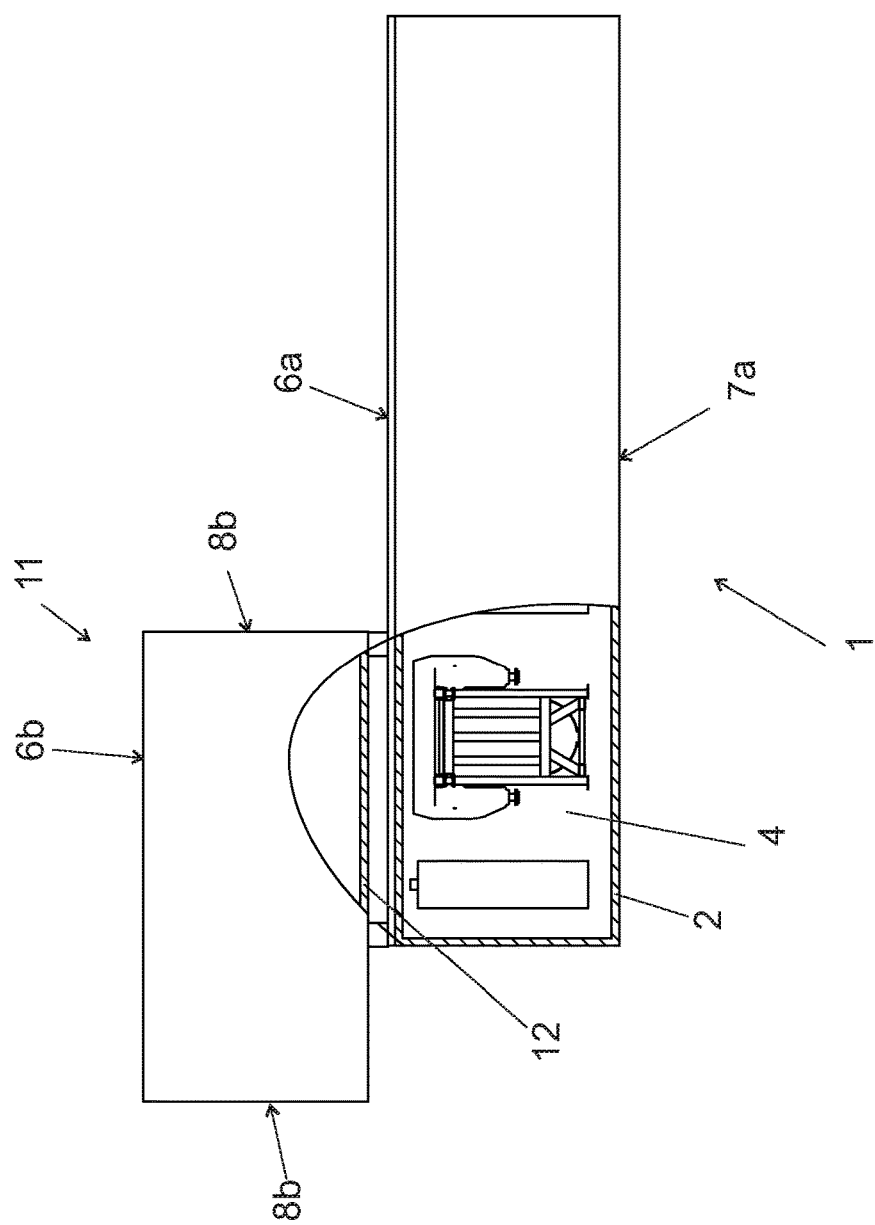
Figure 10:
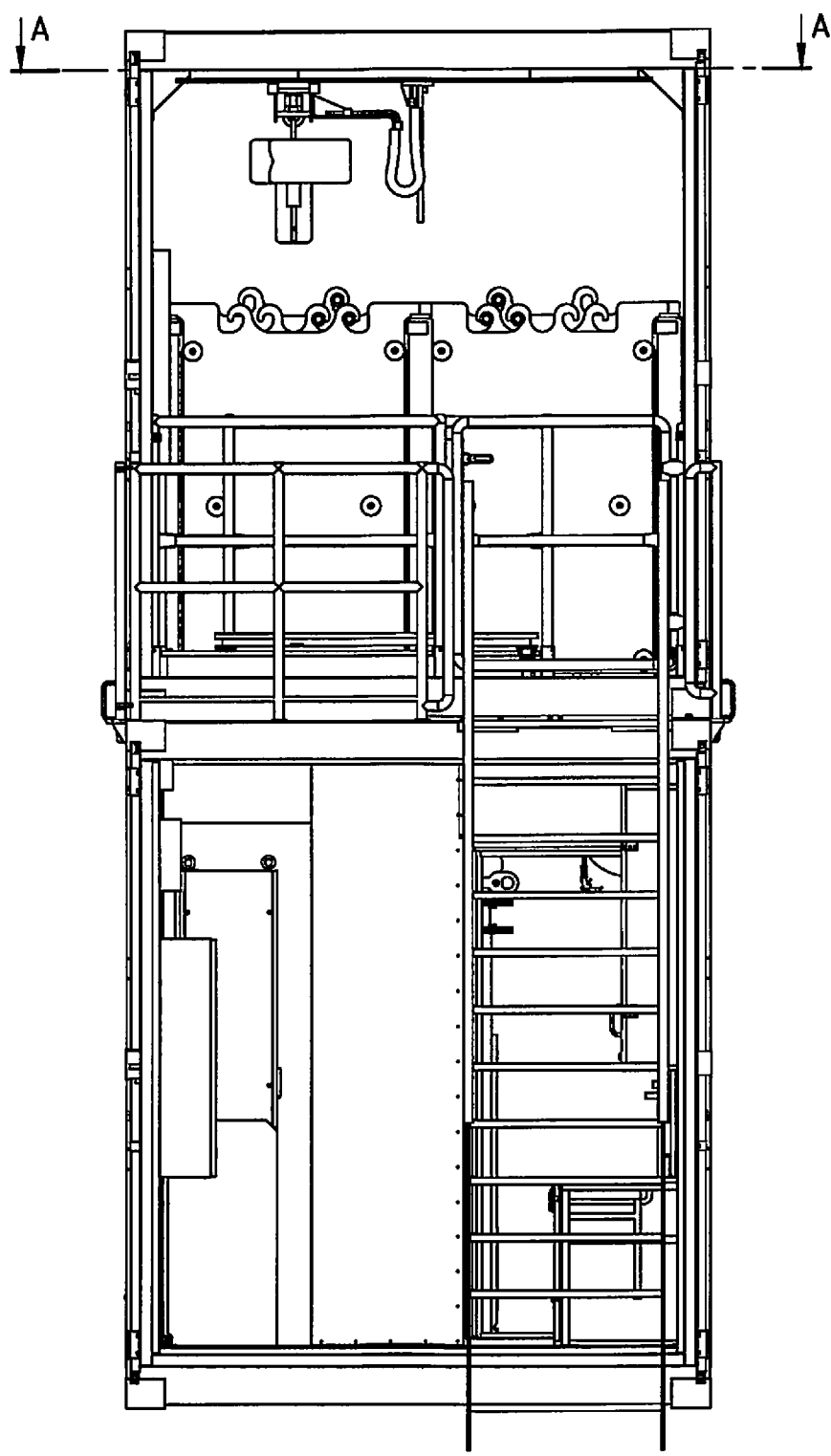
Figure 11:
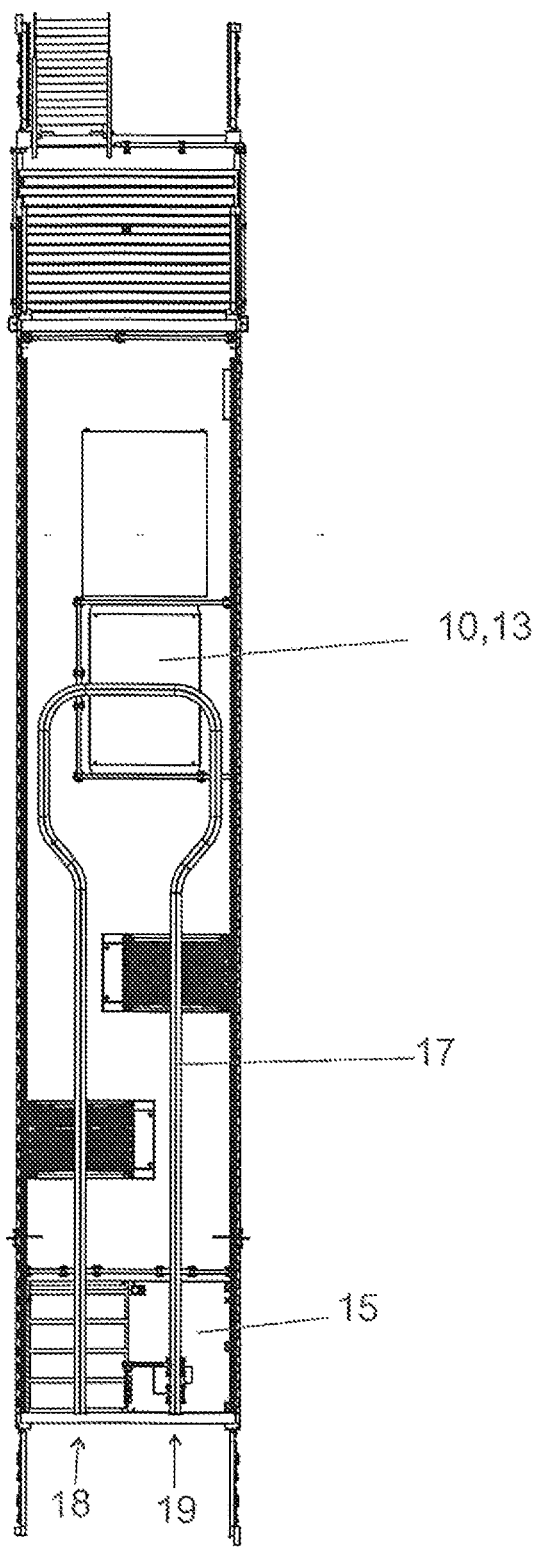
Figure 12:
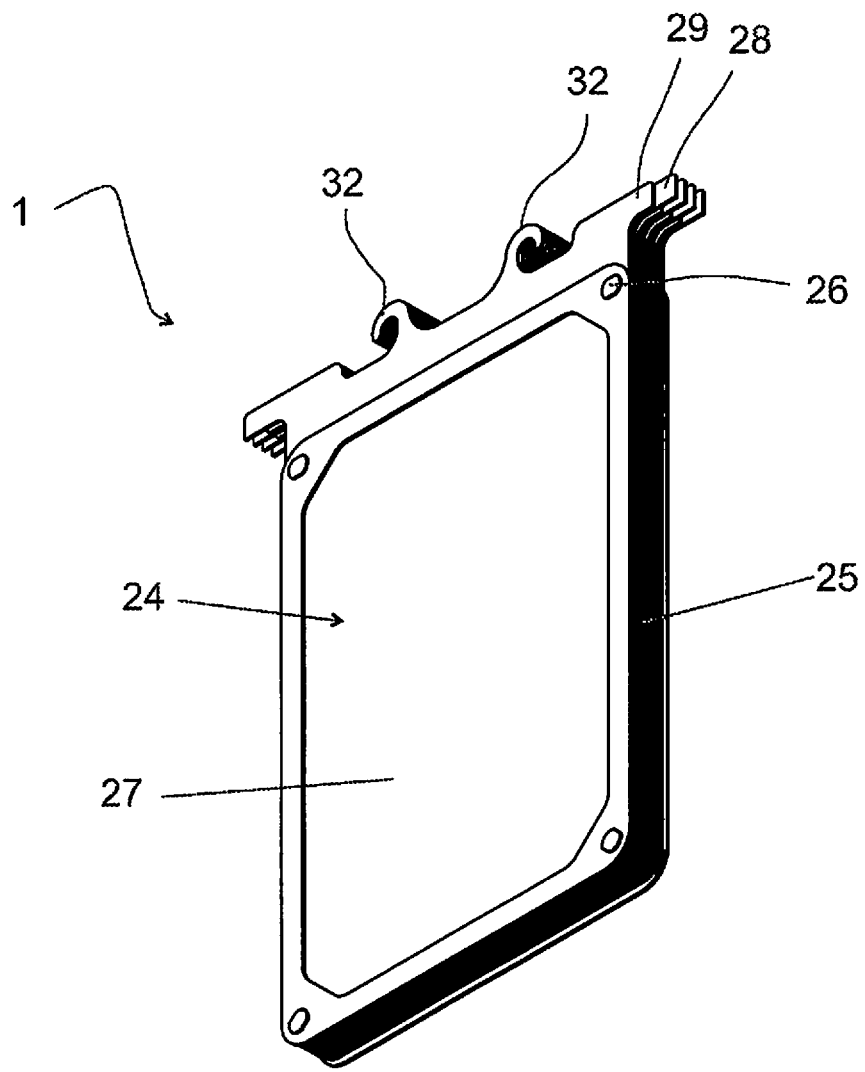
Figure 13:
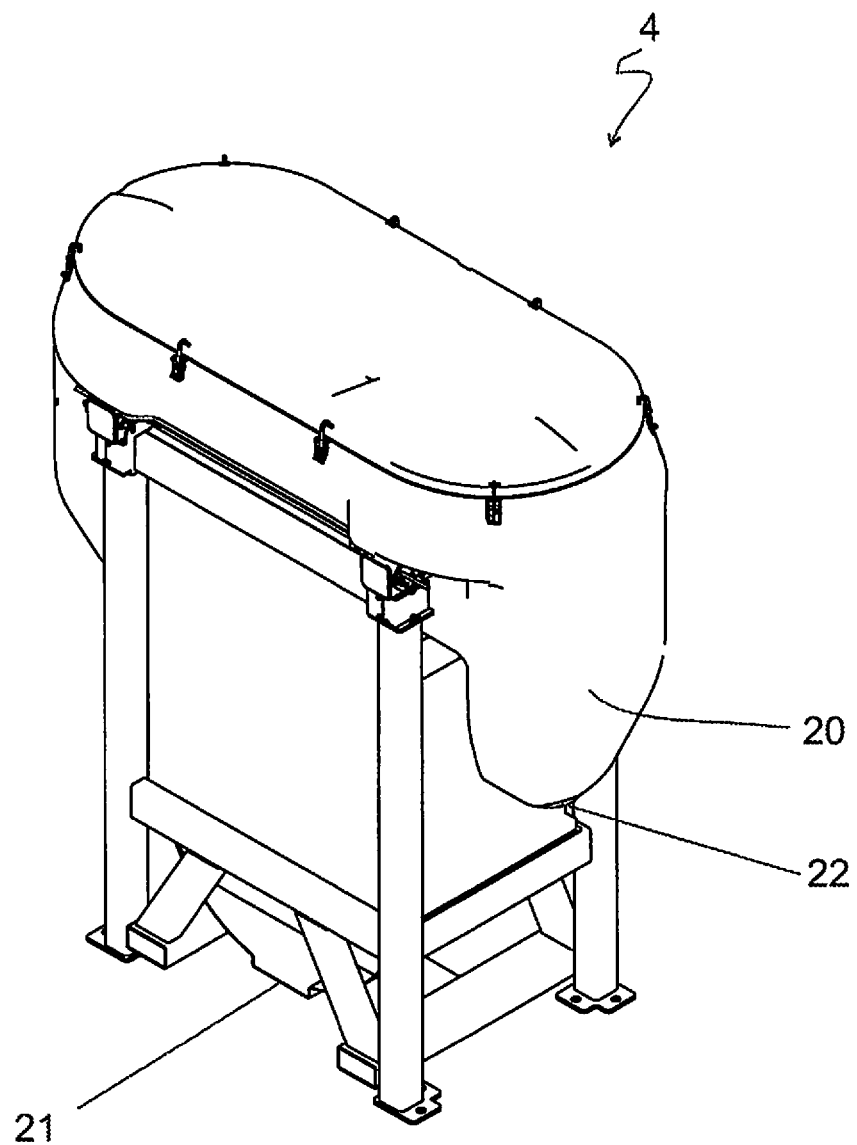
Figure 14:
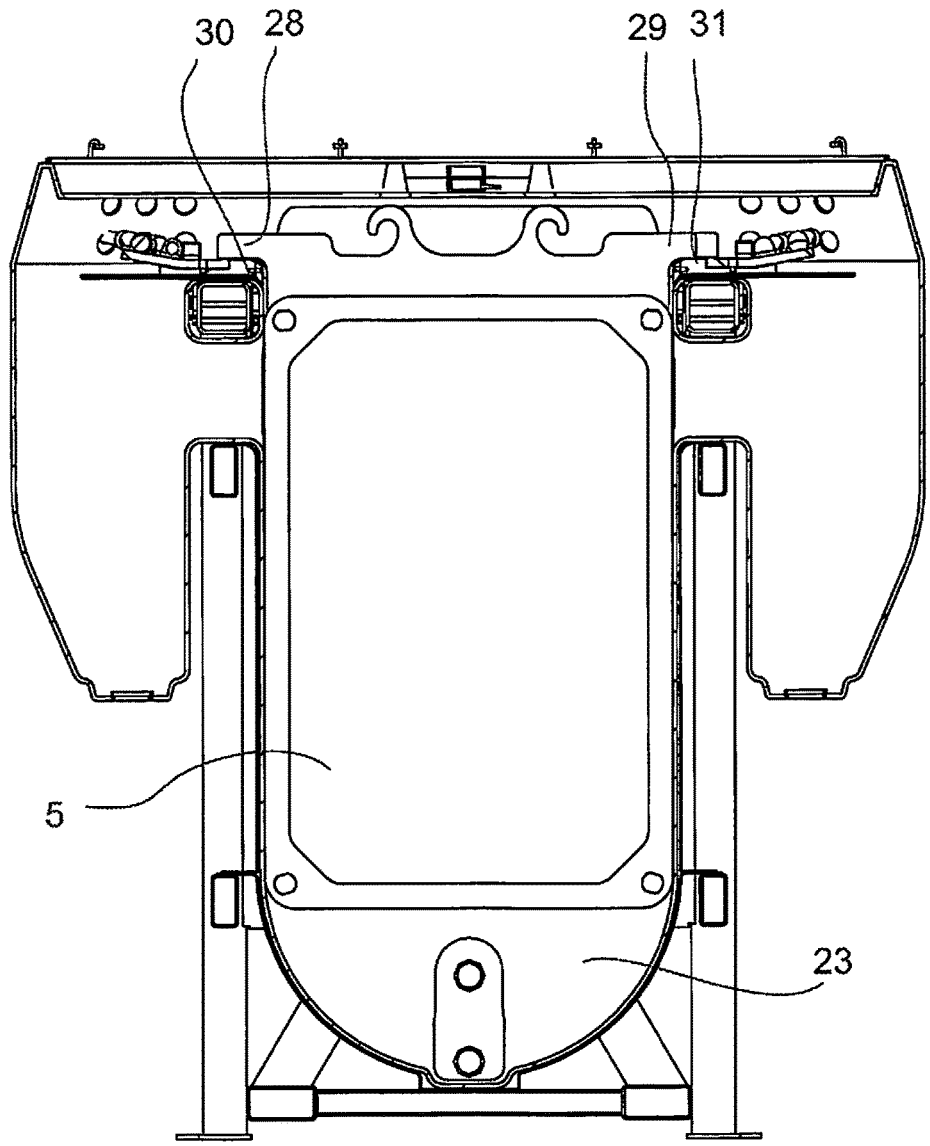

In the following the invention will described in more detail by referring to the figures, which FIG. 1 shows a first embodiment of the system for treating water, FIG. 2 shows the first embodiment of the system that is shown in FIG. 1 in partly cut state, FIG. 3 shows the first embodiment of the system that is shown in FIG. 1 in partly cut state, FIG. 4 shows a second embodiment of the system for treating water, FIG. 5 shows the second embodiment of the system that is shown in FIG. 4 in partly cut state, FIG. 6 shows the second embodiment of the system that is shown in FIG. 4 in partly cut state, FIG. 7 shows a third embodiment of the system for treating water, FIG. 8 shows the third embodiment of the system that is shown in FIG. 7 in partly cut state, FIG. 9 shows the third embodiment of the system that is shown in FIG. 7 in partly cut state, FIG. 10 shows a fourth embodiment of the system for treating water, FIG. 11 shows the fourth embodiment of the system for treating water as cut along line A-A in FIG. 10, FIG. 12 shows an electrode module according to an embodiment, FIG. 13 shows an electrochemical reactor according to an embodiment, and FIG. 14 shows the electrochemical reactor shown in FIG. 13 in cut state.

DETAILED DESCRIPTION OF THE INVENTION

In the following, the system for treating water and some embodiments and variants of the system will be described in greater detail.

The system comprises at least one electrochemical water treatment unit 1 comprising a first self-supporting framework 2 having the outer form of a cuboid and limiting a first inner space 3. The first self-supporting framework 2 comprises preferably, but not necessarily, elongated beams (not marked with a reference numeral) extending at the edges of the first self-supporting framework 2 between the corners of the first self-supporting framework 2.

Said at least one electrochemical water treatment unit can have the shape and outer dimensions of a standardized shipping container such as the shape and outer dimensions of a 20, 30, or 40 foot shipping container or such as the shape and outer dimensions of a 20, 30, or 40 foot high cube shipping container.

At least one electrochemical reactor 4 is arranged in the first inner space 3.

Said at least one electrochemical reactor 4 comprises at least one electrode module 5 releasable arranged in said at least one electrochemical reactor 4.

Said at least one electrochemical water treatment unit 1 comprises a top side 6a, a bottom side 7a, a pair of end sides 8a and a pair of sides 9a.

Said at least one electrochemical water treatment unit 1 comprises a first opening 10 in the top side 6a.

Said at least one electrochemical reactor 4 is arranged in the first inner space 3 of said at least one electrochemical water treatment unit 1 vertically below the first opening 10 in the top side 6a.

The system comprises a maintenance unit 11 comprising a second self-supporting framework 12 having the outer form of a cuboid and limiting a second inner space. The second self-supporting framework 12 comprises preferably, but not necessarily, elongated beams (not marked with a reference numeral) extending at the edges of the second self-supporting framework 12 between the corners of the second self-supporting framework 12.

The maintenance unit 11 can have the shape and outer dimensions of a standardized shipping container such as the shape and outer dimensions of a 20, 30, or 40 foot shipping container or such as the shape and outer dimensions of a 20, 30, or 40 foot high cube shipping container.

The maintenance unit 11 comprises a top side 6b, a bottom side 7b, a pair of end sides 8a and a pair of sides 9b.

The maintenance unit 11 comprises a second opening 13 in the bottom side 7b.

The maintenance unit 11 is configured to be arranged above said at least one electrochemical water treatment unit 1 so that the first opening 10 in the top side 6b of said at least one electrochemical water treatment unit 1 and the second opening 13 in the bottom side 7b of the maintenance unit 11 are aligned and so that a section 14 of the maintenance unit 11 is unsupported by said at least one electrochemical water treatment unit 1.

The system comprises a third opening 15 in the bottom side 7b in said section 14 of the maintenance unit 11.

A hoist 16 is movable arranged along a rail structure 17 at the top side 6b of the maintenance unit 11 in the second inner space of the maintenance unit 11, so that the hoist 16 is movable to a position above the second opening 13 in the bottom side 7b of the maintenance unit 11 and to a position above the third opening 15 in the bottom side 7b of the maintenance unit 11.

The rail structure 17 can be fastened to the top side 6b of the maintenance unit 11.

The rail structure 17 can be fastened to the second self-supporting framework 12 of the maintenance unit 11.

The rail structure 17 can be configured to move the hoist 16 in a U-shaped path. It is also possible that the rail structure 17 can be configured to move the hoist 16 in a straight path or in a path comprising various shaped sections such as curved and straight sections.

In a case where the rail structure 17 is configured to move the hoist in a U-shaped path, the rail structure 17 can be configured to guide the hoist 16 between a first end 18 of the rail structure 17 that is above the third opening 15 in the bottom side 7b of the maintenance unit 11 and a second end 19 of the rail structure that is adjacent to the first end 18 and is above the third opening 15 in the bottom side 7b of the maintenance unit 11 so that the hoist 16 is guided to a position above the second opening 13 in the bottom side 7b of the maintenance unit 11.

Said at least one electrochemical reactor 4 comprises preferably, but not necessarily, a shell structure 20 defining an inner space (not marked with a reference numeral). The shell structure 20 comprises preferably, but not necessarily, an inlet 21 for conducting a water flow into the inner space of the shell structure 20, and preferably, but not necessarily, an outlet 22 for conducting the water flow out of the inner space of the shell structure 20. The inner space of the shell structure 20 comprises preferably, but not necessarily, a reactor chamber 23 between the inlet 21 and the outlet 22, and the electrode module 5 is preferably, but not necessarily, arranged in the reactor chamber 23.

Said at least one electrochemical reactor 4 comprises preferably, but not necessarily, a detachable top lid. The detachable top lid comprises preferably, but not necessarily, lifting portions (not shown in the figures) configured to function together with the hoist 16.

The electrode module 5 comprises preferably, but not necessarily, a plurality of electrode plates 24 arranged in parallel and spaced from one another by means of spacing means 25 and alternately form an anode and a cathode. The electrode module 5 comprises preferably, but not necessarily, a plurality of support members 26 each extending through each electrode plate 24 and at least one spacing means 25 between two adjacent electrode plates 24 for releasable securing said plurality of electrode plates 24 together. Each electrode plate 24 comprises preferably, but not necessarily, a plate portion 27. Each electrode plate 24 comprises preferably, but not necessarily, a supporting and connection lug portion 28 configured to support each electrode plate 24 of the electrode module 5 at one of a first busbar 30 and a second busbar 31 in said at least one electrochemical reactor 4 for electrically connecting each electrode plate 24 of the electrode module 5 with one of the first busbar 30 and the second busbar 31 for supplying electrical current between one of the first busbar 30 and the second busbar 31 and each electrode plate 24 of the electrode module 5. The spacing means 25 are preferably, but not necessarily, made on electrically insulating material. Each electrode plate 24 comprises preferably, but not necessarily, additionally a supporting lug portion 29 configured to support each electrode plate 24 of the electrode module 5 in the electrochemical reactor 4 without electrically connecting the supporting lug 29 portion to one of a first busbar 30 and a second busbar 31 in the electrochemical reactor 4.

The electrode module 5 includes preferably, but not necessarily, lifting portions 32, such as hook portions, configured to cooperate with the hoist 16.

The hoist 16 comprises preferably, but not necessarily, a trolley 33, preferably a motor driven trolley, configured to move along the rail structure 17, and a hook arrangement 34 that is suspended by a chain, a wire or the like from the trolley 33 and that is configured to cooperate with the electrode module 5 of said at least one electrochemical reactor 4.

Said at least one electrochemical water treatment unit 1 comprises preferably, but not necessarily, electrical power means (not shown in the figures) for supplying electrical current to the electrode module 5 of said at least one electrochemical reactor 4.

The maintenance unit 11 can be configured to be stationary arranged above said at least one electrochemical water treatment unit 1. Alternatively, the maintenance unit 11 can be configured to be movably arranged above said at least one electrochemical water treatment unit 1.

The maintenance unit 11 is preferably, but not necessarily, configured to be arranged above said at least one electrochemical water treatment unit 1 so that the maintenance unit 11 is supported on top of said at least one electrochemical water treatment unit 1. Alternatively or additionally, the maintenance unit 11 can be configured to be arranged above said at least one electrochemical water treatment unit 1 so that the maintenance unit 11 is supported on the ground.

The maintenance unit 11 can be configured to be releasably arranged above said at least one electrochemical water treatment unit 1.

At least one of said at least one electrochemical water treatment unit 1 and the maintenance unit 11 can be provided with a roof structure at the top side 6a and/or 6b, with a floor structure at the bottom side 7a and/or 7b, with an end wall structure at least one of the end sides 8a and/or 8b and/or with a side wall structure at least one of the sides 9a and/or 9b.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A system for treating water comprising:
   at least one electrochemical water treatment unit comprising a first self-supporting framework having an outer form of a cuboid and limiting a first inner space, wherein at least one electrochemical reactor is arranged in the first inner space, wherein the at least one electrochemical reactor comprises at least one electrode module releasably arranged in the at least one electrochemical reactor, wherein the at least one electrochemical water treatment unit comprises a top side, a bottom side disposed opposite to the top side, a pair of opposed end sides and a pair of opposed sides extending between the top side, bottom side, and opposed end sides, wherein the at least one electrochemical water treatment unit comprises a first opening in the top side, and wherein the at least one electrochemical reactor is arranged in the first inner space of the at least one electrochemical water treatment unit vertically below the first opening in the top side;
   a maintenance unit comprising a second self-supporting framework having an outer form of a cuboid and limiting a second inner space, wherein the maintenance unit comprises a top side, a bottom side disposed opposite to the top side, a pair of opposed end sides and a pair of opposed sides extending between the top side, bottom side, and opposed end sides, and wherein the maintenance unit comprises a second opening in the bottom side;
   the maintenance unit configured to be arranged above the at least one electrochemical water treatment unit so that the first opening in the top side of the at least one electrochemical water treatment unit and the second opening in the bottom side of the maintenance unit are aligned and so that a section of the maintenance unit is unsupported by the at least one electrochemical water treatment unit;
   a third opening in the bottom side in the section of the maintenance unit; and
   a hoist movably arranged along a rail structure at the top side of the maintenance unit in the second inner space of the maintenance unit, so that the hoist is movable to a position above the second opening in the bottom side of the maintenance unit and to a position above the third opening in the bottom side of the maintenance unit.

2. The system according to claim 1, wherein the rail structure is operatively fastened to the top side of the maintenance unit.

3. The system according to claim 1, wherein the rail structure is operatively fastened to the second self-supporting framework.

4. The system according to claim 1, wherein the rail structure is configured to move the hoist in a U-shaped path.

5. The system according to claim 1, wherein the rail structure is configured to guide the hoist between a first end of the rail structure that is above the third opening in the bottom side of the maintenance unit and a second end of the rail structure that is above the third opening in the bottom side of the maintenance unit so that the hoist is guided from an initial position to the position above the second opening in the bottom side of the maintenance unit.

6. The system according to claim 1, wherein the at least one electrochemical reactor comprises a shell structure defining an inner space,
   the shell structure comprising an inlet for conducting a water flow into the inner space of the shell structure,
   the shell structure comprising an outlet for conducting the water flow out of the inner space of the shell structure,
   the inner space of the shell structure comprising a reactor chamber between the inlet and the outlet, and
   the electrode module being arranged in the reactor chamber.

7. The system according to claim 1, wherein the at least one electrochemical reactor comprises a detachable top lid.

8. The system according to claim 1, wherein the hoist comprises a hook arrangement configured to cooperate with the electrode module of the at least one electrochemical reactor.

9. The system according to claim 1, wherein the electrode module comprises a plurality of electrode plates arranged in parallel and spaced from one another by means of spacing means and alternately forming an anode and a cathode,
   the electrode module comprising a plurality of support members and at least one spacing means, each support member of the plurality of support members extending through the plurality of electrode plates and the at least one spacing means interposed between two adjacent electrode plates of the plurality of electrode plates for releasably securing said plurality of electrode plates together,
   each electrode plate of the plurality of electrode plates comprising a plate portion, and
   each electrode plate of the plurality of electrode plates comprising a respective supporting and connection lug portion configured to support each respective electrode plate of the electrode module at one of a first busbar and a second busbar in said at least one electrochemical reactor for electrically connecting each electrode plate of the electrode module with one of the first busbar and the second busbar for supplying electrical current between one of the first busbar and the second busbar and each electrode plate of the electrode module.

10. The system according to claim 9, wherein each electrode plate further comprises a supporting lug portion configured to support each electrode plate of the electrode module in the electrochemical reactor without electrically connecting the supporting lug portion to one of a first busbar and a second busbar in the electrochemical reactor.

11. The system according to claim 1, wherein the electrode module includes lifting portions configured to cooperate with the hoist.

12. The system according to claim 1, wherein the hoist comprises a trolley that is movably arranged at the rail structure, and a hook arrangement suspended from the trolley.

13. The system according to claim 1, wherein the at least one electrochemical water treatment unit comprises electrical power means for supplying electrical current to the electrode module of the at least one electrochemical reactor.

14. The system according to claim 1, wherein the maintenance unit is configured to be arranged above the at least one electrochemical water treatment unit so that a portion of the maintenance unit is supported on top of the at least one electrochemical water treatment unit.

15. The system according to claim 11, wherein the lifting portions of the electrode module is a hook portion.

16. The system according to claim 12, wherein the trolley of the hoist is a motor driven trolly.

\* \* \* \* \*